UNITED STATES PATENT OFFICE.

JEAN D. OLIGNY, OF MONTREAL, ASSIGNOR TO DANIEL ORMOND FRYE, OF LACHINE LOCKS, AND LOUIS GIBSON HARRIS, OF TORONTO, CANADA.

ARTIFICIAL FUEL.

SPECIFICATION forming part of Reissued Letters Patent No. 11,519, dated December 24, 1895.

Original No. 537,931, dated April 23, 1895. Application for reissue filed November 5, 1895. Serial No. 568,063.

*To all whom it may concern:*

Be it known that I, JEAN D. OLIGNY, of the city of Montreal, in the Province of Quebec and Dominion of Canada, have invented certain new and useful Improvements in Artificial Fuel; and I do hereby declare that the following is a full, clear, and exact description of the same.

My invention, which will be hereinafter fully set forth and claimed, relates to artificial fuel obtained from the utilization of garbage, city refuse, peat and the like.

The object of my invention is two-fold, being the manufacture of a cheap artificial fuel, and at the same time the disposal and utilization of waste products—such as garbage, city refuse, sawdust, manure and the like.

I make a composition of the following ingredients well mixed together, using by preference and to obtain the best results the relative proportions named as follows, to wit: one hundred gallons of sodius oil, ten pounds of chloride of calcium, three hundred and thirty-three grams of caustic soda and one hundred and fifty grams of powdered soap. This quantity of material is to be thoroughly mixed with garbage, refuse or other material, and, when a sufficient quantity of such garbage, refuse or other material is added to make four tons of fuel or thereabout, more or less, according to the nature of the other materials and their state of moisture or dryness, the best fuel is obtained.

"Sodius oil" is a commercial term and the article sold under that name is prepared as follows: two-thirds tar-oil, one-third gas-oil with about five pounds of resin to each forty gallons of the mixed oil, after which it goes through a process which extracts the heavier portions, leaving the lighter parts to form sodius oil.

This composition is heated and as much garbage, refuse, or other materials, or all or any of them, is thrown and stirred in as will completely absorb it. Garbage containing up to sixty-five per cent. of moisture will yield good results when made into fuel with the above composition.

I claim as my invention—

1. A composition of matter for artificial fuel composed of garbage, refuse, or other materials in such quantity as will completely absorb a composition consisting of one hundred gallons of sodius oil, ten pounds of chloride of calcium, three hundred and thirty three grams of caustic soda, and one hundred and fifty grams of powered soap, or in about the proportions named, the whole yielding about four tons of fuel, substantially as set forth.

2. A composition for the preparation of artificial fuel, consisting of one hundred gallons of sodius oil, ten pounds of chloride of calcium, three hundred and thirty three grams of caustic soda and one hundred and fifty grams of powdered soap, or thereabout, substantially as set forth.

3. A composition of matter for artificial fuel composed of garbage, refuse or other materials, mixed with a composition of sodius oil, chloride of calcium, caustic soda and powered soap, substantially as set forth.

4. A composition for the preparation of artificial fuel consisting of a mixture of sodius oil, chloride of calcium, caustic soda and powered soap, substantially as set forth.

In testimony whereof I have signed in the presence of the undersigned witnesses.

JEAN D. OLIGNY.

Witnesses:
WILLIAM M. LENNAN,
W. C. JENKIN.